(12) United States Patent
Parrish

(10) Patent No.: US 6,293,521 B1
(45) Date of Patent: Sep. 25, 2001

(54) SYSTEMS FOR POSITIONING AND TENSIONING WIRES IN TRELLIS SYSTEMS FOR VINEYARDS

(76) Inventor: David E. Parrish, 11206 Ave. 264, Visalia, CA (US) 93277

( * ) Notice: Subject to any disclaimer, the term of this patent is extended or adjusted under 35 U.S.C. 154(b) by 0 days.

(21) Appl. No.: 09/371,758

(22) Filed: Aug. 10, 1999

(51) Int. Cl.$^7$ ................................................ B21F 9/00
(52) U.S. Cl. ............................ 254/199; 47/46; 47/47; 256/48
(58) Field of Search ........................... 254/199, 222, 254/223, 263, 213; 47/44, 46, 47, 70, 83; 256/32, 35, 48, 58

(56) References Cited

U.S. PATENT DOCUMENTS

| | | | |
|---|---|---|---|
| 527,311 | * 10/1894 | Austin | 254/223 |
| 561,534 | * 6/1896 | Boggs | 256/35 |
| 711,651 | * 10/1902 | Andrew | 254/222 |
| 752,854 | * 2/1904 | Odell | 254/48 |
| 997,022 | * 7/1911 | Tennant et al. | 47/46 |
| 1,051,185 | * 1/1913 | Anderson | 254/213 |
| 1,452,766 | * 4/1923 | Stefan, Jr. | 256/48 |
| 1,480,917 | * 1/1924 | Robinson | 47/44 |
| 1,488,380 | * 3/1924 | Blake | 47/46 |
| 2,519,921 | * 8/1950 | Mock | 254/222 |
| 2,641,448 | * 6/1953 | Duke | 256/48 |
| 2,702,182 | * 2/1955 | Wenger | 256/48 |
| 2,764,389 | * 9/1956 | Daniels | 256/48 |
| 2,929,121 | * 3/1960 | Tinnerman | 256/48 |
| 2,944,788 | * 7/1960 | Schaffer | 254/213 |
| 3,197,919 | * 8/1965 | Pasztor | 47/46 |
| 3,416,763 | * 12/1968 | Moreno | 254/213 |
| 3,791,070 | * 2/1974 | Roberts | 47/46 |
| 3,800,365 | * 4/1974 | Burggert | 47/47 |
| 3,949,968 | * 4/1976 | Verhelst | 254/213 |
| 4,008,880 | * 2/1977 | Devis | 254/199 |
| 4,099,299 | * 7/1978 | Bruggert et al. | 47/44 |
| 4,223,872 | * 9/1980 | Boal | 254/58 |
| 4,258,523 | * 3/1981 | Waugh | 47/46 |
| 4,270,737 | * 6/1981 | Binns et al. | 256/48 |
| 4,298,185 | * 11/1981 | Janssen | 254/213 |
| 4,534,129 | * 8/1985 | Stuckey | 47/44 |
| 4,536,989 | * 8/1985 | Caywood et al. | 47/44 |
| 5,004,211 | * 4/1991 | Rayner | 256/47 |
| 5,438,795 | * 8/1995 | Balbraith | 47/46 |
| 5,501,035 | * 3/1996 | Downer et al. | 47/47 |
| 5,797,214 | * 8/1998 | Parrish et al. | 47/47 |
| 5,916,028 | * 6/1999 | Downer et al. | 47/46 |
| 7,270,581 | * 6/1981 | Claxton et al. | 47/46 |

FOREIGN PATENT DOCUMENTS

| | | | |
|---|---|---|---|
| 3336574 | * 4/1985 | (DE) | 254/199 |
| 397014 | * 11/1908 | (FR) | 254/199 |
| 685971 | * 1/1953 | (GB) | 254/199 |

* cited by examiner

Primary Examiner—Emmanuel M. Marcelo
(74) Attorney, Agent, or Firm—Dennis B. Haase

(57) ABSTRACT

In a vineyard or the like, a system for positioning and tensioning the wires which form the trellis disposed between and among an array of metal posts upon which vines are trained, including retainers for selectively positioning wires relative to the metal posts and each other and further including a subsystem for applying the appropriate tension to the various wires making up the trellis.

11 Claims, 3 Drawing Sheets

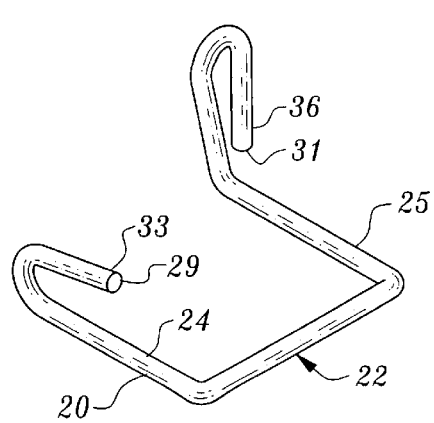
Fig. 1
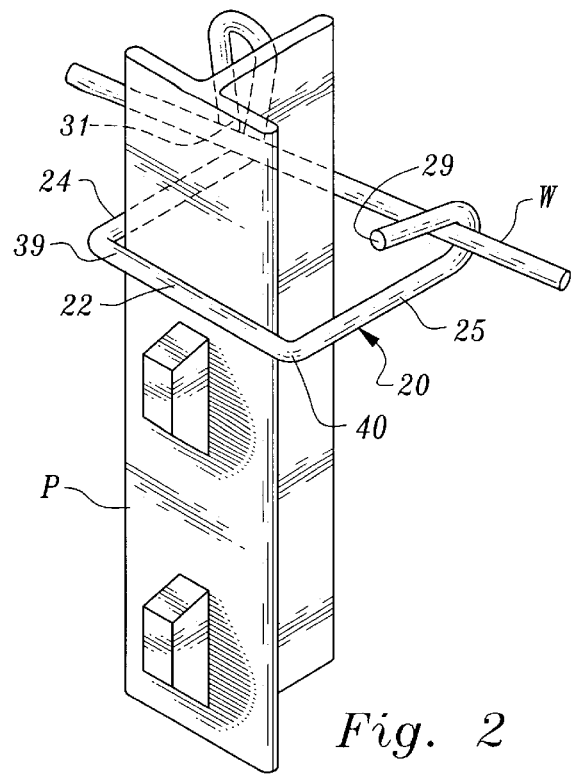
Fig. 2
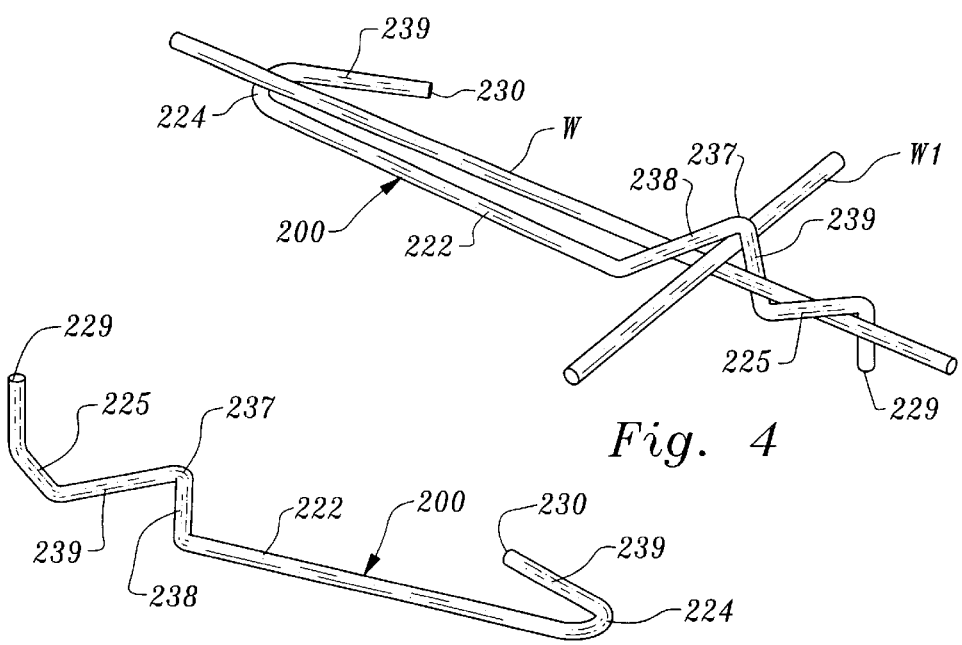
Fig. 3
Fig. 4

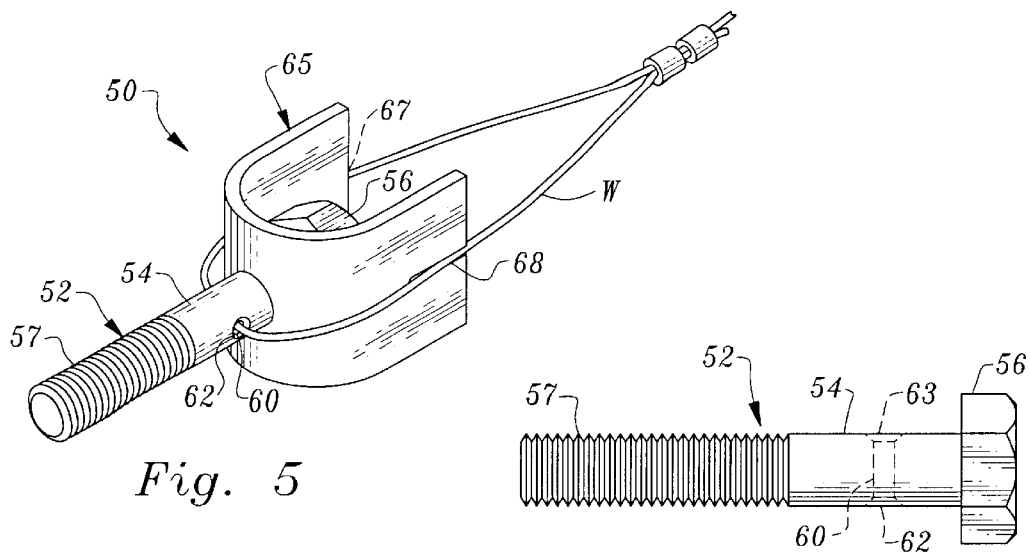
Fig. 5
Fig. 6
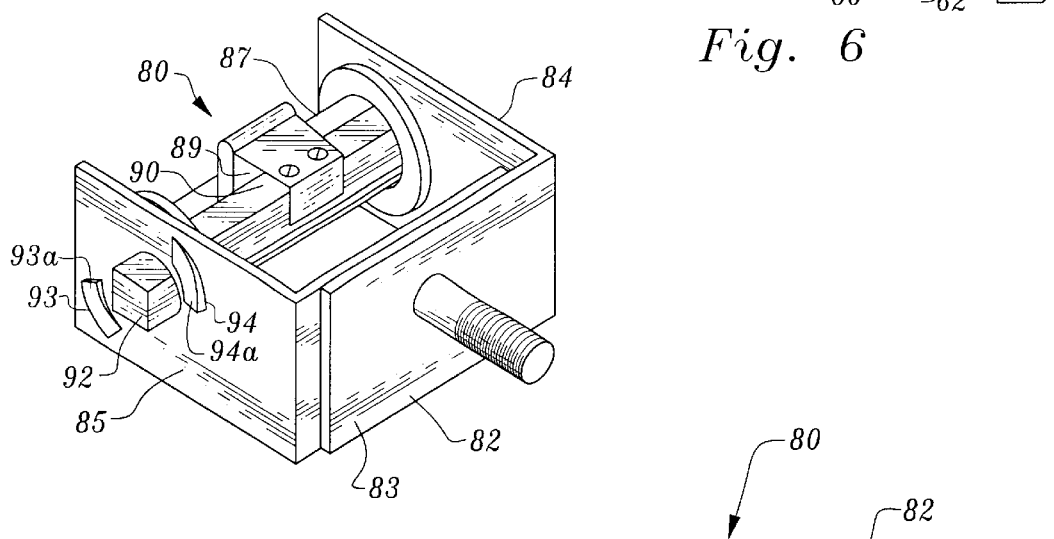
Fig. 7
Fig. 8

SYSTEMS FOR POSITIONING AND TENSIONING WIRES IN TRELLIS SYSTEMS FOR VINEYARDS

The present invention relates generally to systems for constructing trellis systems for vineyards, and, more particularly, to a system of devices for engaging, retaining and tensioning lengths of wire used in forming the wire matrix indigenous to trellissystems especially constructed to train and implement the growing and harvesting of vine fruit.

BACKGROUND OF THE INVENTION

1. Field of the Invention

Vine fruit such as grapes have been grown and trained on trellis structures for decades. In the heretofore typical case, wooden posts, or stakes, are driven into the ground, and a cross arm is nailed to the post near the top thereof. The posts are arranged in rows, and each row is (now) spaced from its adjacent row by a distance sufficient to permit mechanized equipment, such as a tractor, to operate between rows. The same spacing also provides easy access to the vines for workers who prune, train the vines and pick the fruit.

More recently, the use of steel posts has become popular. The steel posts do not rot below the soil line, and they do not break off under loading, which increases as the fruit develops and matures. Thus, while the steel posts cost more than wooden posts, maintenance is materially reduced, and utility enhanced.

It is not realistic, however, to drive a nail or a staple into a steel post in order to secure trellis wires to them or the cross arms attached to them. It is workable, but impractical to attempt to manually tie each wire to a post or cross arm individually and, to some extent, it defeats the purpose of the modem trellis system which is intended to be significantly less labor intensive.

2. Overview of the Prior Art

The system of the present invention has particular, although not exclusive, utility in the novel trellis configuration taught in Parrish et al. U.S. Pat. No. 5,797,214, wherein steel posts and cross arms support trellis wires upon which vines are trained for, inter alia, mechanical harvest.

A form of wire retainer is shown in Pásztor U.S. Pat. No. 3,197,919 as number 7 and is in the nature of a staple. In Boal U.S. Pat. No. 4,223,872 the post is slotted to receive a wire. However, when a "T" post is used, slotting such as this would weaken the post and defeat the purpose of its use.

Roberts U.S. Pat. No. 3,791,070 suggests the use of retaining hooks 32, 34 and 36, but in Roberts the hooks are integrally formed with the cross beam 12 and would be unsuitable for use in a trellis system such as that for which the present invention is readily adapted. Gailbraith U.S. Pat. No. 5,438,795 suggests straps with slots provided for the receipt of wire, but there remains the very real problem of how to attach these straps to a steel post, such as a "T" post.

In truth, the heretofore accepted method of securing wire to a steel post by individually tying the same at each point of connection, appears to be a docile resignation to popular taste, at least until the advent of the present invention.

SUMMARY OF THE INVENTION

The present invention comprises a system for establishing a matrix, or trellis, of lengths of wire properly tensioned and positioned to form an efficient vineyard infrastructure for the growing and mechanical harvesting of vine fruit.

As an integral part of the system, there is a set of preformed, relatively resilient, retainers which are capable of holding fast a series of wires to steel posts and including intersecting wires together defining a matrix, so as to establish a trellis system capable of supporting grape vines laden with fruit. The retainers operate in concert with tensioning devices to define the novel system of the present invention.

In accordance with the foregoing, it is a primary purpose of the present invention to accomplish the efficient formation of a trellis system, including steel posts, and particularly "T" posts, in a fast, efficient and inexpensive manner.

It is another objective of the present invention to provide a fastener and tensioning system which is capable of being understood and used by the most inexperience worker, to accomplish this and other objectives in a minimum amount of time and hand labor.

It is a further objective to provide a fastener system which permits a quick and easy adjustment of the relative position of wires and posts, both in initial assembly and from to time during the year as the situation demands.

Yet another objective is to provide a capability of providing small adjustments in the tension of wires once joined and/or attached in the intended manner and configuration.

The foregoing, as well as other objectives and advantages of the present invention, will become apparent to one skilled in the art with a reading of the description of a preferred embodiment, taken in conjunction with the drawings, wherein:

IN THE DRAWINGS

FIG. 1 depicts a retainer for use as part of a system for retaining and tensioning wires of a trellis system, having particular utility in attaching wires to a "T" post in accordance with the teachings of the invention;

FIG. 2 illustrates a use of the retainer of FIG. 1 in operative engagement with a "T" type metal post in current popular use;

FIG. 3 is a retainer of the general type shown in FIG. 1, but having the special ability to engage and position intersecting wires of a trellis;

FIG. 4 is a perspective view of the retainer of FIG. 2, illustrating certain of the features thereof in greater detail;

FIG. 5 is an anchoring device for anchoring a wire of a trellis as part of the functional tensioning and retaining system of the present invention;

FIG. 6 illustrates the apertured bolt which is part of the anchor of FIG. 5;

FIG. 7 is a tensioner, usable in concert with the anchor of FIG. 5, and is further capable of being secured relative to a fixed object;

FIG. 8 is a side elevation of the tensioner of FIG. 7, illustrating, in particular, a portion of the one way ratcheting mechanism which appears on both sides;

DETAILED DESCRIPTION OF PREFERRED EMBODIMENTS

With reference now to the drawings, a system for positioning and securing wires, together comprising a trellis for the growing, training and harvesting of vine fruit, is illustrated with respect to its various components, and comprises a series of interactive retainers and tensioning devices, all of which operate in concert to define the system of the present invention.

Figure 11:
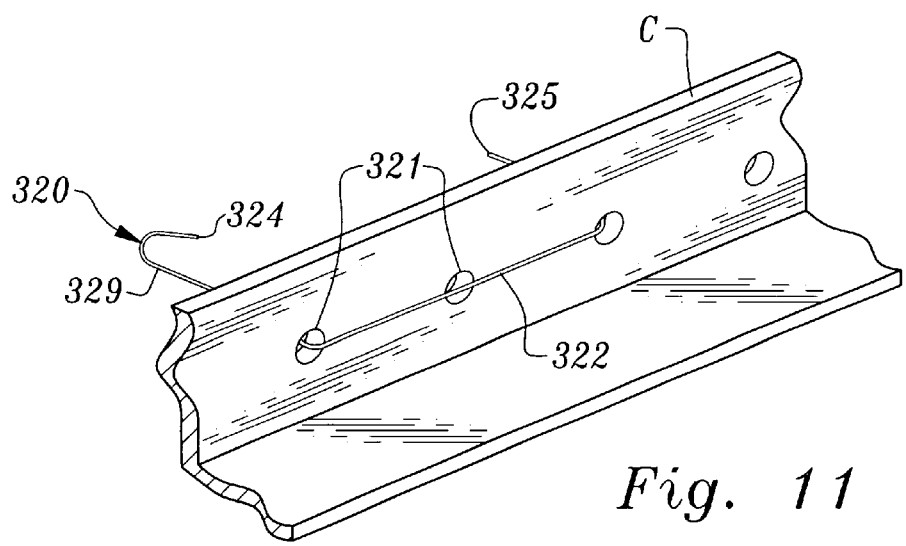

Such a trellis for which the present invention has particular, although not exclusive, utility comprises an array of rows of vertical "T" posts, "P", strategically placed to facilitate cultivation and harvesting; each post having cross arms "C" (a portion of which is illustrated in FIG. 11) which receive and support wires which are strung and tensioned longitudinally along the various rows, and cross wires running from row to row, upon which the vines are trained such that the fruit receives optimum sunlight and is particularly easy to harvest. The various wires may be further secured relative to one another and tensioned to sustain the loads created by developing and maturing fruit, all in keeping with the invention.

With initial focus now on the device shown in FIGS. 1 and 2, a retainer 20, constructed in accordance with the invention, is illustrated in some detail.

The retainer is formed of a relatively resilient length of wire having a central portion 22 separating, by a predetermined distance, a pair of integrally formed legs 24 and 25. It will be seen that the legs 24 and 25 are substantially coplanar with the middle portion 22. At the free end, or termini, 29 and 31 of each of the legs 24 and 25, the wire is formed into an upstanding hook-like configuration by bending the wire back in the plane of the legs to form a loop.

In accordance with one aspect of the invention, one of the termini, in the illustrated case 29, the loop defined by terminus 29 is open, i.e., the end thereof, 33 extends rearwardly toward the middle portion 22, but does not touch the leg 24. The terminus 31 of leg 25, on the other hand, has its end 36 initially bent or otherwise disposed such that it is in substantial contact with the leg 25.

With reference now to FIG. 2, and in keeping with another aspect of the invention, the retainer 20 is so dimensioned as to partially circumscribe a post P, which is, in the case shown, a steel T-shaped post, in current vogue in the grape industry because of its strength and durability. These characteristics make such posts eminently useful in building and supporting grape trellises in that they are particularly strong in withstanding the loads on them resulting from the initial tensioning of the wire which makes up the trellis, and the subsequent, not insubstantial, weight of the growing and maturing vines.

The fitting of the retainer 20 at the desired position on the post is accomplished by predetermining the length of the middle portion 22 as essentially the same as the dimension a of the "T" leg of the post P. By virtue of the elasticity of the wire, it may be snapped into position on the post, as may be seen in FIG. 2.

Once in position on the post P, the retainer 20 is capable, in accordance with this aspect of the invention, of receiving a wire W. Still referring to FIG. 2, the wire W is readily captured within the hook, or loop, defined by the terminus 29, and at a short distance therefrom, the terminus 31 is bent upwardly, preferably manually, although any number of tools may be used within the contemplation of the invention to accomplish the purpose. In this manner, the wire is quickly and positively positioned and secured at two points, 39 and 40, to the post P where the tension on the wire W works in conjunction with the retainer 20 to achieve the desired result.

In a similar fashion, and for an essentially similar purpose, the invention further contemplates the provision of another retainer 200, best seen in FIG. 3. The retainer 200, in the manner of the retainer 20, is constructed of a wire which is strong yet sufficiently resilient to be manipulated manually.

Thus, the retainer 200, which serves well as an inter-wire retainer, includes a middle portion 222. Legs 224 and 225 are formed with and flank the middle portion 222. Each of the legs 224 and 225 have terminal ends 229 and 230, or loop, by bending the ends thereof, respectively, rearwardly toward the legs 224 and 225.

The middle portion is formed into a coil appearing as a modified "Z" configuration, again referring to FIG. 3, with a bend at the intersection 237 of sections 238 and 239 of the middle portion 222.

Referring now to FIGS. 3 and 4, the leg 225, together with the section 238 to which it is integrally formed, lie in a substantially single plane, whereas the section 239 and the leg 224 with which it is formed, lie in approximately the same plane, which plane forms an obtuse angle relative to the plane of leg 225, which angle may be in the range of 110 to 140 degrees.

With particular reference now to FIG. 4, the retainer 200 circumscribes both the wire W and an intersecting or crossing wire $W_1$ by simple manual manipulation, so as to position and secure both wires relative to one another.

In constructing a trellis which is capable of handling the weight of a fruit bearing vine, which weight increases with growth, it is important that the trellis wires be prestressed, by putting them under appropriate initial tension. Since the wires are typically very long and susceptible, over time, to stretching by at least a small amount, it is important, as part of a complete system, to be able to easily and effectively adjust the tension of the wires initially and periodically thereafter. In many instances, the adjustment may be relatively small, but nonetheless important to the function and maintenance of the trellis system.

To this end, and for this purpose, a tensioning sub system, including an anchor device 50, is illustrated in FIGS. 5 and 6, is operable in conjunction with a tensioner 80.

With reference first to FIGS. 5 through 9, the anchor portion of the tensioning system is illustrated as having two inter related facets. Referring first to FIG. 6, a fastener 52 is illustrated as having a shank 54, with a head 56 at one end and a threaded portion 57. At a point on the shank, below the head 56 and above the threaded portion 57, an aperture 60 is formed, passing transversely through the shank, with the openings 62 and 63 on either side of the shank 54 being countersunk to permit a wire to be threaded therethrough, as best seen in FIG. 5.

The fastener, as seen in FIG. 5, is passed through a clevis shaped washer 65. The clevis has grooves 67 and 68 formed in it, by any suitable well known means. The grooves are aligned and of such width and depth as to receive a single wire W to hold the wires in position against inadvertent movement. The clevis is so shaped as to avoid severe bending of the wire, and, in fact, permits the wire to be secured with little or no damage to the wire itself.

Figure 9:
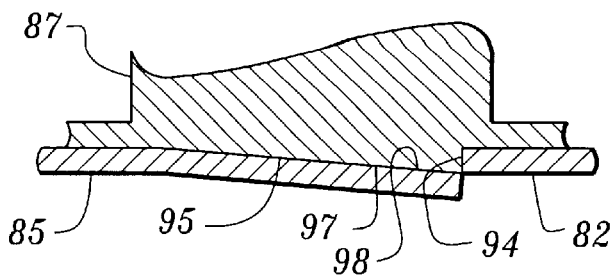
FIG. 9 is a view of the tensioner, illustrating a portion of the ratcheting mechanism of FIG. 8, partially sectioned to illustrate the mechanism in greater detail.

In operation, a wire W is threaded through the aperture 60 in the fastener 52, and encircles the clevis such that the wire in the grooves 67 and 68 is thus positioned in the direction of the tension to be applied, and the threaded portion is then secured to any stationary object, in a well known manner, so that it may be tensioned by a tensioning device, also sometimes referred to a strainer, and illustrated in FIGS. 7, 8 and 9 at 80.

The tensioner 80, which is the other component of this synergistic system, comprises a "U" shaped frame 82 having a center span 83 which is flanked by outstretched legs 84 and 85, which are integrally formed with the center span 83; and transverse thereto. A reel 87 is mounted in and extends between the legs 84 and 85, where it is secured in bearing relation with the legs for rotation on its longitudinal axis. The reel is shaped to avoid sharp edges which could crimp, or otherwise damage, the wire. An aperture 89 is formed in or near the midsection of the reel to receive an end of a wire in a circumferentially formed slot 90.

Protruding from each of the legs 84 and 85 is an axially disposed driver 92. The driver is preferably configured to receive a conventional socket or other wrench which is fitted over the driver, and then used to rotate the reel to tension the wire W.

It is vital, of course, to hold the tension once it is achieved, and to this end the reel includes, in concert with the legs 84 and 85, a one way ratcheting mechanism in the nature of a one way clutch, best seen in FIGS. 8 and 9.

This mechanism includes a pair of truncated, arcuate slots 93 and 94 formed in each of the legs 84 and 85 although, for illustration purposes, only one leg is shown. The slots are formed by stamping, or punching, the desired configuration, which results in outwardly extending guides 93a and 94a, respectively.

Immediately adjacent the inner wall of the legs and on the reel, there is formed at least one, but perhaps several, ramps 95 spaced about the reel and aligned with the slots 93 and 94. Thus, when the reel is rotated, for example, counterclockwise, wire affixed to the reel will wind on the barrel and tension on the wire is thus increased as the ramps 95 will sequentially slide into and out of the slots.

When the desired tension on the wire is achieved, further rotation on the reel is halted, and, when that rotational force is released, the tension on the wire created by such rotation will induce a counter rotation, such that when the ramps move into the slots, the forward face 97 will abut the wall 98 of the slot, and further rotation of the reel with be prevented. The proper tension on each wire is, thus, achieved.

Figure 10:
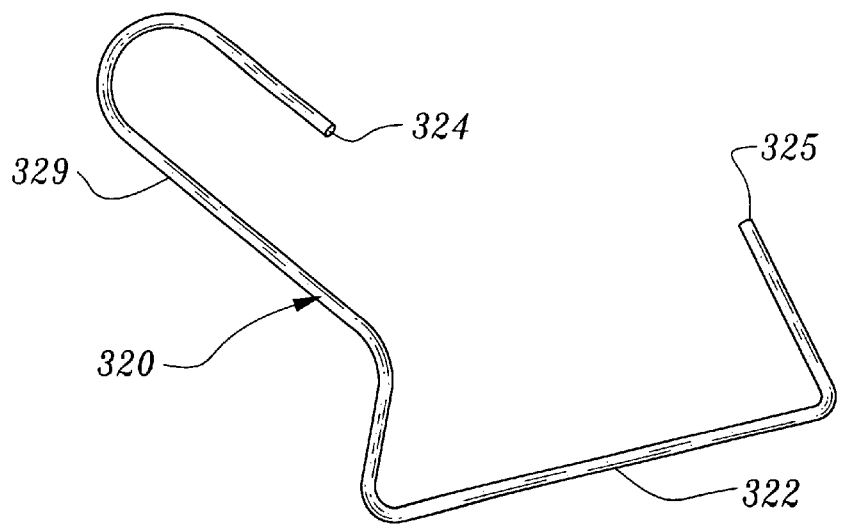
FIG. 10 illustrates a modified form of the retainer of FIG. 1, having the capacity of positioning a wire of a trellis relative to a cross arm on a "T" post; and, FIG. 11 is illustrative of the retainer of FIG. 10 in actual use.

Now, with reference to FIGS. 10 and 11, there is provided, as part of the system, a modified retainer 320, which retainer is particularly, although not exclusively, adapted to attach a wire of the trellis to a cross arm "C" affixed to a post "P". The cross arm "C" is formed with several apertures 321 aligned in a row. In order to make maximum advantage of this construction, the retainer has a center portion 322, having a length which approximates the distance between two apertures 321 and terminates in opposed legs 324 and 325.

Leg 324, in keeping with the purposes of the invention as to the capture and positioning of a wire of the trellis, terminates in a hook 329. The hook is open and is capable of securing a wire relative to the cross arm "C" when the retainer is snapped into apertures 321 therein as best seen in FIG. 11.

Having described the present invention in detail, what is claimed is:

1. In a system for positioning and tensioning wires, said wires intersecting to form a trellis mounted to an array of metal posts, each said metal post including a cross arm affixed thereto, said cross arm having several apertures formed therein, said apertures being substantially equally spaced, and aligned in a row along the longitudinal axis thereof;
   at least one tensioning subsystem for applying a predetermined tension on each said wire;
   a retainer, said retainer securing one of said wires relative to said cross arm, said retainer having a center portion, the length of which is substantially equal to the distance between adjacent apertures, opposed legs being formed integrally with said center portion, one of said legs terminating in a hook, said hook being open to receive a said wire, with said legs projecting through adjacent said apertures and being snapped into position on said cross arm.

2. The system as set forth in claim 1, wherein said tensioning subsystem includes a tensioner at one end of the wire and an anchor at the other.

3. The tensioning subsystem as set forth in claim 2, wherein said tensioner is manually operable to change the tension on the wire.

4. The tensioning subsystem as set forth in claim 1, wherein said tensioner comprises
   a frame, said frame being grounded,
   a spool, said spool being mounted in said frame for relative rotation, an end of said wire being attached to said spool;
   a one way clutch mechanism, said one way clutch mechanism interposed between said frame and said spool for inhibiting rotation of said spool other than in a direction which would apply tension to the wire attached thereto.

5. The tensioning subsystem as set forth in claim 4, wherein said one way clutch comprises a series of ramps disposed on said spool in face to face relation with said frame; slots in said frame formed in a radius about said spool, and so aligned with said ramps such that when said spool is rotated, said ramps enter said slots and inhibit rotation of said spool other than in a direction which results in tension on the wire.

6. In a system for positioning and tensioning wires, which wires intersect to form a trellis mounted on an array of metal posts, each said metal post including a cross arm affixed thereto, wherein the trellis and posts together define a matrix for the growing of vine fruit, means for securing said wires relative to said metal posts comprising:
   a plurality of retainers, including a retainer for securing at least one wire relative to a metal post, said retainer comprising an elongate, relatively resilient length of wire, said wire being so formed as to attach to a portion of a said metal post, said retainer having at least one loop formed at an end thereof, said loop being open so as to receive a wire of said trellis and secure the same relative to the said metal post in a predetermined position;
   at least one tensioning subsystem for applying a predetermined tension on each said wire;
   a second retainer for securing at least one said wire relative to a metal post, said retainer comprising an elongate, relative resilient length of a said wire, said wire being so formed as to attach to a portion of said metal post, said retainer having at least one loop formed at an end thereof, said loop being open so as to receive a said wire of said trellis and secure the same relative to the said metal post in a predetermined position; each said metal post being formed with a series of coplaner apertures aligned in a row and wherein said retainer is adapted to be fitted into at least two of said apertures to secure the same to the said metal post;
   at least a third retainer for securing at least one wire relative to another, said retainer comprising an elongate, relatively resilient length of a said wire, said retainer having at least one loop formed at an end thereof, said loop being open so as to receive a said wire of said trellis; an elbow formed in said length of a said wire, said elbow adapted to circumscribe an intersecting wire of the trellis to thereby secure said wires relative to one another.

7. The tensioning subsystem as set forth in claim 6, wherein said tensioner comprises a frame, said frame being grounded, a spool, said spool being mounted in said frame for relative rotation, an end of said wire being attached to said spool;

a one way clutch mechanism, said one way clutch mechanism interposed between said frame and said spool for inhibiting rotation of said spool other than in a direction which would apply tension to the wire attached thereto.

8. The tensioning subsystem as set forth in claims 7, wherein said one way clutch comprises a series of ramps disposed on said spool in face to face relation with said frame; slots in said frame formed in a radius about said spool, and so aligned with said ramps such that when said spool is rotated, said ramps enter said slots and inhibit rotation of said spool other than in a direction which results in tension on the wire.

9. The system as set forth in claim 6, having at least one tensioning subsystem for applying a predetermined tension on each said wire.

10. The system as set forth in claim 9, wherein said tensioning subsystem includes a tensioner at one end of the said wire and an anchor at the other.

11. The tensioning subsystem as set forth in claim 9, wherein said tensioner is manually operable to change the tension on the said wire.

\* \* \* \* \*